US009539728B2

(12) United States Patent
Nammoto et al.

(10) Patent No.: US 9,539,728 B2
(45) Date of Patent: Jan. 10, 2017

(54) ROBOT HAND AND ROBOT DEVICE

(71) Applicant: Seiko Epson Corporation, Tokyo (JP)

(72) Inventors: Takashi Nammoto, Sendai (JP); Kazuhiro Kosuge, Sendai (JP); Kengo Yamaguchi, Sendai (JP); Kosuke Hara, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/036,086

(22) Filed: Sep. 25, 2013

(65) Prior Publication Data

US 2014/0103676 A1 Apr. 17, 2014

(30) Foreign Application Priority Data

Oct. 11, 2012 (JP) ................................. 2012-226072

(51) Int. Cl.
*B66C 1/42* (2006.01)
*B25J 15/00* (2006.01)
*B25J 18/02* (2006.01)

(52) U.S. Cl.
CPC ............. *B25J 15/0009* (2013.01); *B25J 18/02* (2013.01)

(58) Field of Classification Search
CPC ... B25J 15/0009; B25J 15/0616; B25J 15/103; B25J 18/02
USPC ....... 294/106, 213, 902, 907, 183, 186, 185; 901/32, 33, 34, 38, 39, 40, 46; 623/64
See application file for complete search history.

(56) References Cited

U.S. PATENT DOCUMENTS

| | | | | |
|---|---|---|---|---|
| 2,814,488 A | * | 11/1957 | Kipers | B65B 43/18 141/65 |
| 4,351,553 A | * | 9/1982 | Rovetta et al. | 294/106 |
| 5,108,140 A | * | 4/1992 | Bartholet | 294/106 |
| 5,280,981 A | * | 1/1994 | Schulz | 294/106 |
| 5,337,541 A | * | 8/1994 | Gmuer | B65B 43/30 53/386.1 |
| 5,735,200 A | * | 4/1998 | Tomei | B30B 15/30 100/215 |
| 5,762,390 A | | 6/1998 | Gosselin et al. | |
| 6,505,870 B1 | * | 1/2003 | Laliberte et al. | 294/106 |
| 6,918,622 B2 | | 7/2005 | Kim et al. | |
| 7,168,748 B2 | * | 1/2007 | Townsend et al. | 294/106 |

(Continued)

FOREIGN PATENT DOCUMENTS

| | | |
|---|---|---|
| JP | 60-25686 | 2/1985 |
| JP | 2003-275984 A | 9/2003 |

(Continued)

*Primary Examiner* — Gabriela Puig
(74) *Attorney, Agent, or Firm* — Harness, Dickey & Pierce, P.L.C.

(57) ABSTRACT

A robot hand includes a finger unit that includes a first knuckle section that is supported to a predetermined base section and a second knuckle section that is supported to the first knuckle section; a drive section that includes a male screw that is rotatable around a predetermined screw axis by a predetermined drive source and a female screw that is screw-coupled with the male screw and moves in an axial direction of the screw axis according to rotation of the male screw, in which the female screw and the first knuckle section are connected to each other so that the first knuckle section moves in association with movement of the female screw; and a link section that connects the first knuckle section and the second knuckle section so that the second knuckle section moves in association with movement of the first knuckle section.

11 Claims, 15 Drawing Sheets

(56) References Cited

U.S. PATENT DOCUMENTS

| | | | |
|---|---|---|---|
| 7,370,896 B2* | 5/2008 | Anderson et al. | 294/106 |
| 8,424,942 B2* | 4/2013 | Park et al. | 294/106 |
| 8,720,964 B2* | 5/2014 | Birglen | 294/106 |
| 2003/0090115 A1* | 5/2003 | Kim et al. | 294/106 |
| 2005/0110292 A1* | 5/2005 | Baumann et al. | 294/64.1 |
| 2010/0156125 A1* | 6/2010 | Lee et al. | 294/88 |
| 2012/0205932 A1* | 8/2012 | Nammoto et al. | 294/213 |
| 2013/0119687 A1* | 5/2013 | Dai | 294/200 |
| 2013/0183129 A1* | 7/2013 | Nammoto et al. | 414/729 |
| 2014/0103673 A1* | 4/2014 | Nammoto et al. | 294/106 |
| 2014/0197652 A1* | 7/2014 | Wang | B25J 15/0616 294/185 |
| 2014/0261962 A1* | 9/2014 | Sawatzky | B65H 5/08 156/64 |
| 2015/0033677 A1* | 2/2015 | Vaucher | B65B 43/18 53/492 |
| 2015/0251320 A1* | 9/2015 | Ueno | B25J 15/0616 414/737 |

FOREIGN PATENT DOCUMENTS

| | | |
|---|---|---|
| JP | 2004-041279 A | 2/2004 |
| JP | 2004-174625 A | 6/2004 |
| JP | 2007-237364 A | 9/2007 |
| JP | 2010-158754 A | 7/2010 |
| JP | 2013-146798 A | 8/2013 |
| WO | WO 2005105391 A1 * | 11/2005 |

* cited by examiner

ROBOT HAND AND ROBOT DEVICE

BACKGROUND

1. Technical Field

The present invention relates to a robot hand and a robot device.

2. Related Art

In the related art, a robot hand has been proposed that is mounted at a tip of an industrial robot arm or the like and holds and releases an object to perform a predetermined operation. More specifically, a multifunctional robot hand has been proposed that holds a tool to perform an operation such as assembly of components and holds minute components to arrange the minute components with accuracy (for example, refer to JP-A-60-25686).

JP-A-60-25686 discloses a robot hand technique that uses a differential gear mechanism and a spring as a passive element and can reliably and stably hold a holding target (object) in spite of change in the shape of the object, thereby having sufficient adaptability against external disturbance.

However, the robot hand and the robot device in the related art have the following problems.

That is, in the robot hand in the related art, the passive element has a simple function of opening or closing all the fingers but does not have a function of diversifying a contact point according to fitness of a finger unit to an object. Thus, two finger units included in the robot hand cannot be in contact with the object at multiple contact points, which makes it difficult to hold the object in a stable state.

Further, in the robot hand in the related art, since the shape of the fingers of the hand is fixed, it is difficult to perform an operation with the ball (inside) of the finger being in close contact with the object, for example.

SUMMARY

An advantage of some aspects of the invention is to provide a robot hand and a robot device that are capable of stably holding various objects having various shapes or sizes in various postures of the hand in a simple manner and at low cost.

An aspect of the invention is directed to a robot hand including: a finger unit that includes a first knuckle section that is supported to a predetermined base section and a second knuckle section that is supported to the first knuckle section; a drive section that includes a male screw that is rotatable around a predetermined screw axis by a predetermined drive source and a female screw that is screw-coupled with the male screw and moves in an axial direction of the screw axis according to rotation of the male screw, in which the female screw and the first knuckle section are connected to each other so that the first knuckle section moves in association with movement of the female screw; and a link section that connects the first knuckle section and the second knuckle section so that the second knuckle section moves in association with movement of the first knuckle section.

According to this configuration, since the first knuckle section and the second knuckle section are connected to each other by the link section so that the second knuckle section moves in association with the movement of the first knuckle section, it is possible to perform an opening and closing operation and a bending operation of the finger unit in association. Further, since the drive section is provided that includes the male screw that is rotatable around the predetermined screw axis and the female screw that is screw-coupled with the male screw and moves in the axial direction of the screw axis according to the rotation of the male screw, in which the female screw and the first knuckle section are connected to each other so that the first knuckle section rotates in association with the movement of the female screw, a force applied to the finger unit is transmitted (back-drivable) to the drive source through the male screw, the female screw and the like, and thus, for example, it is possible to perform control so that the drive source outputs a constant torque. Thus, it is possible to generate a constant force in the finger unit. Thus, it is possible to stably hold an object. Hence, it is possible to achieve a robot hand that is capable of stably holding various objects having various shapes or sizes in various holding postures of the hand, in a simple manner and at low cost.

In the robot hand of the aspect of the invention, it is preferable that the link section includes a first connection section that connects the base section and the first knuckle section so that the first knuckle section is rotatable around a first axis that is parallel to a tangential line of a virtual circle centering around a reference axis; and a second connection section that connects the first knuckle section and the second knuckle section so that the second knuckle section is rotatable around a second axis that is parallel to an axial direction of the first axis. According to this configuration, the rotational direction of the first knuckle section and the rotational direction of the second knuckle section are aligned. Thus, it is possible to efficiently perform the opening and closing operation and the bending operation of the finger unit in association.

In the robot hand of the aspect of the invention, it is preferable that the link section includes a locking portion that is locked to the first connection section in a state where the first knuckle section and the second knuckle section form an angle of 180° around the second connection section.

According to this configuration, since the link section includes the locking portion that is locked to the first connection section in a state where the first knuckle section and the second knuckle section form the angle of 180° around the second connection section, it is possible to suppress the first knuckle section and the second knuckle section from being excessively opened. Thus, it is possible to stably hold an object.

In the robot hand of the aspect of the invention, it is preferable that the base section includes a planar surface portion that intersects with the reference axis, the planar surface portion is provided at an end portion in an axial direction of the reference axis, and the finger unit is disposed so that the first knuckle section and the second knuckle section protrude upward in the extending direction of the reference axis with respect to the planar surface portion according to rotation of the first knuckle section.

According to this configuration, since the base section includes the planar surface portion that intersects with the reference axis, the planar surface portion is provided at the end portion in the axial direction of the reference axis, and in the finger unit, the first knuckle section and the second knuckle section are disposed to protrude upward in the extending direction of the reference axis with respect to the planar surface portion according to rotation of the first knuckle section, it is possible to support an object using the planar surface portion. Thus, it is possible to use the planar surface portion like a palm.

In the robot hand of the aspect of the invention, it is preferable that the planar surface portion has a frictional coefficient higher than that of a front surface of the finger unit.

According to this configuration, since the frictional coefficient of the planar surface portion is higher than that of the front surface of the finger unit, an object is hardly shifted on the planar surface portion, and thus, it is possible to stably support the object.

In the robot hand of the aspect of the invention, it is preferable that the second knuckle section includes an attracting section that attracts an object.

According to this configuration, since the second knuckle section includes the attracting section that attracts the object, it is possible to stably retain even an object having flexibility.

In the robot hand of the aspect of the invention, it is preferable that three or more finger units are provided to surround the base section around the reference axis.

According to this configuration, since three or more finger units are provided to surround the base section around the reference axis, it is possible to more stably hold an object.

Another aspect of the invention is directed to a robot device including: a robot hand that includes a finger unit that includes a first knuckle section that is supported to a predetermined base section and a second knuckle section that is supported to the first knuckle section, a drive section that includes a male screw that is rotatable around a predetermined screw axis by a predetermined drive source and a female screw that is screw-coupled with the male screw and moves in an axial direction of the screw axis according to rotation of the male screw, in which the female screw and the first knuckle section are connected to each other so that the first knuckle section moves in association with movement of the female screw, and a link section that connects the first knuckle section and the second knuckle section so that the second knuckle section moves in association with movement of the first knuckle section; and a multi-axial arm that supports the robot hand.

According to this configuration, since the first knuckle section and the second knuckle section are connected to each other by the link section so that the second knuckle section moves in association with the movement of the first knuckle section, it is possible to perform an opening and closing operation and a bending operation of the finger unit in association. Further, since the drive section is provided that includes the male screw that is rotatable around the predetermined screw axis and the female screw that is screw-coupled with the male screw and moves in the axial direction of the screw axis according to the rotation of the male screw, in which the female screw and the first knuckle section are connected to each other so that the first knuckle section moves in association with the movement of the female screw, a force applied to the finger unit is transmitted (back-drivable) to the drive source through the male screw, the female screw and the like, and thus, for example, it is possible to perform control so that the drive source outputs a constant torque. Thus, it is possible to generate a constant force in the finger unit. Thus, it is possible to stably hold an object. Hence, it is possible to achieve a robot device that is capable of stably holding various objects having various shapes or sizes in various holding postures of the hand, in a simple manner and at low cost.

In the robot device of the aspect of the invention, it is preferable that the multi-axial arm is provided in plural.

According to this configuration, since the robot hand is provided to each of two arms, it is possible to perform an operation in a state where an object is held by both the arms. Thus, it is possible to realize a holding state that is hardly achieved in the related art, and to realize various holding states.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
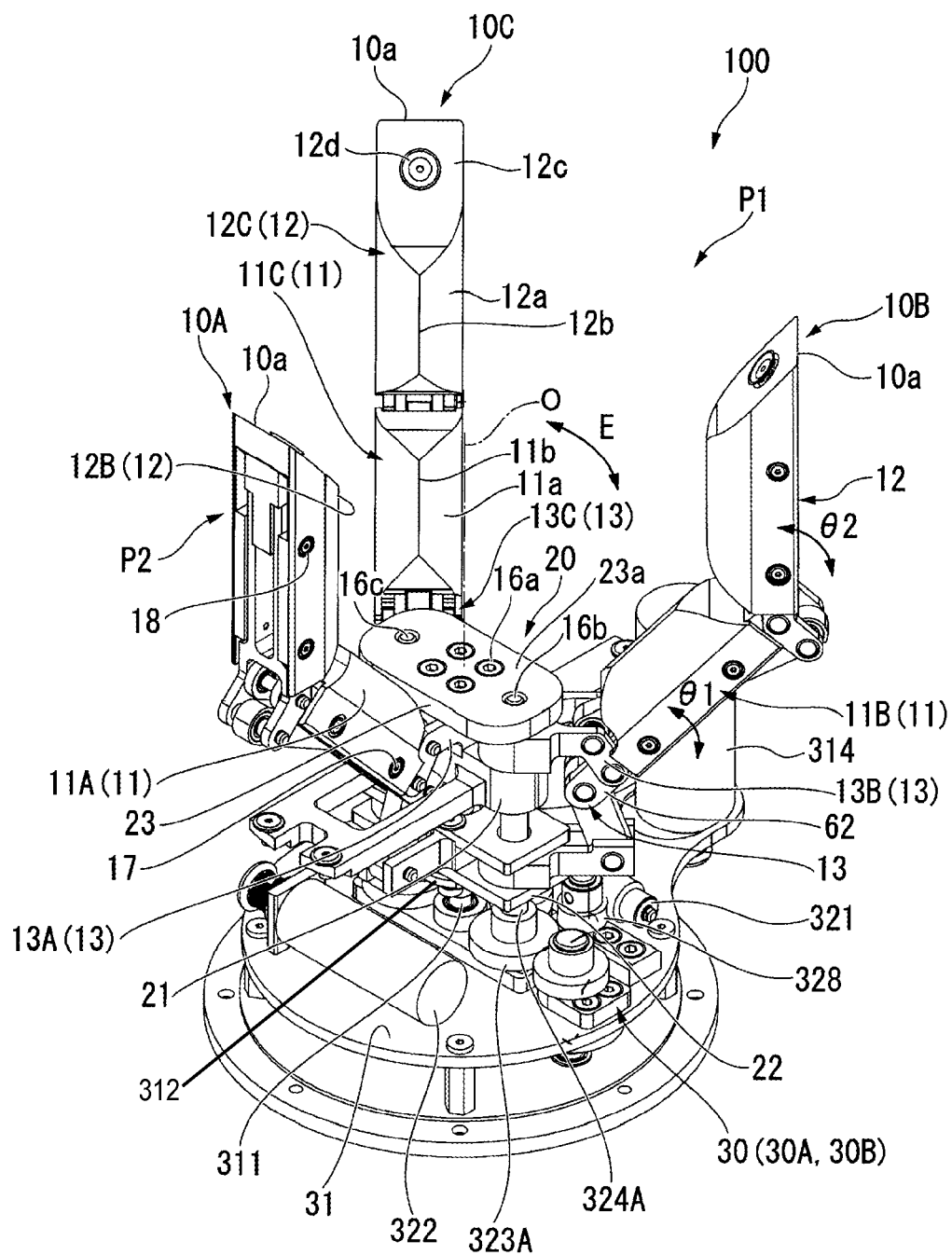
FIG. 1 is a perspective view illustrating an entire configuration of a robot hand according to a first embodiment of the invention.

Hereinafter, a robot hand and a robot device according to exemplary embodiments of the invention will be described referring to the accompanying drawings. In the drawings, for easy understanding of respective configurations, real structures and the scale or number of each structure are varied.

First Embodiment

As shown in FIG. 1, a robot hand 100 according to a first embodiment is used as a holding device of an industrial robot that holds an object such as a tool or a component. The robot hand 100 may be used for other purposes (outer space field, medical field, food field, play equipment field or the like), as well as for the industrial robot.

Specifically, the robot hand 100 has a schematic configuration that includes three finger units 10A, 10B and 10C (first finger unit 10A, second finger unit 10B and third finger unit 10C), a support section (base section) 20 that supports the finger units 10A, 10B and 10C, and a drive section 30 that drives the finger units 10A, 10B and 10C.

Here, an axis that is orthogonal to a common plane (support plate to be described later) where base end portions of three finger units 10A, 10B and 10C are positioned and forms a rotation central axis line of the finger unit 10A is referred to as a hand axis (reference axis) O. The finger units 10A, 10B and 10C, the support section 20 and the drive section 30 are arranged along the hand axis O.

Further, the tip side of the finger units 10A, 10B and 10C along the direction of the hand axis O is referred to as an upside, the side of the drive section 30 is referred to as a downside, and a direction that is orthogonal to the hand axis O is referred to as a radial direction. Further, a direction that rotates around the hand axis O is referred to as a circumferential direction (turning-around-axis direction; arrow E direction). In the present embodiment, turning around the vicinity of the hand axis O is also collectively referred to as "turning". For example, turning centers of the second finger unit 10B and the third finger unit 10C shift from the hand axis O, but this case is also referred to as turning.

Three finger units 10A, 10B and 10C are respectively provided to be able to perform an opening and closing operation by an opening and closing mechanism 30A of the drive section 30. The positions of respective finger tips 10a in a fully opened state and in a fully closed state according to the opening and closing operation are concentric around the hand axis O when seen from a planar view in FIG. 1.

Strictly speaking, since the respective rotation centers of the finger units 10A, 10B and 10C are different from each other, the above-mentioned positions are not concentric around the hand axis O. However, in the present embodiment, it is assumed that the positions are concentric. Further, the first finger unit 10A among three finger units 10A, 10B and 10C is fixed and does not move in the circumferential direction E, and the second finger unit 10B and the third finger unit 10C are provided to be able to move in the circumferential direction E by a turning movement section 30B of the drive section 30.

Each turning range of the second finger unit 10B and the third finger unit 10C covers a range of 180° or greater from a first finger position P1 that is opposite to the first finger unit 10A to a second finger position P2 that is close to the first finger unit 10A. Here, the expression "opposite" includes both of a strictly opposite state and an approximately opposite state.

That is, the turning range of the second finger unit 10B is a range where the second finger unit 10B turns along a plane that intersects with a plane, in which the base end portions of three finger units 10A, 10B and 10C (root portions on an opposite side of the tips of the finger units) are disposed, including the central line of the second finger unit 10B (line along a length direction of the second finger unit 10B). On the other hand, the turning range of the third finger unit 10C is a range where the third finger unit 10C turns along a plane that intersects with a plane, in which the base end portions of three finger units 10A, 10B and 10C are disposed, including the central line of the third finger unit 10C (line along a length direction of the third finger unit 10C). Here, the turning ranges of the second finger unit 10B and the third finger unit 10C are respectively set to 180° or greater.

The finger units 10A, 10B and 10C are sections that hold an object. Each of the finger units 10A, 10B and 10C has a first knuckle section 11 on the base end portion side, and a second knuckle section 12 on the tip side. The first knuckle section 11 is connected to the support section 20 by a fixed link (first connecting section) 13. The second knuckle section 12 is connected to the first knuckle section 11 by a tip link (second connecting section) 14. The fixed link 13 and the tip link 14 are connected to each other by a connection link (link section) 15. Hereinafter, configurations of respective sections of the finger units 10A, 10B and 10C will be sequentially described.

The first knuckle section 11 includes a contact member 11a that is in contact with an object. The contact member 11a is made of an elastically deformable material, for example. Accordingly, the contact member 11a is easily deformed when the inside of the finger units 10A, 10B and 10C is pressed against the object, which makes it possible to be in contact with the object at a large area. The contact member 11a may be configured to have a hollow portion on the inside thereof. Accordingly, the amount of deformation in a case where the contact member 11a is pressed against the object is increased. In this regard, the contact member 11a may be made of a rigid material.

The contact member 11a includes a protrusion 11b at a central portion in a width direction (short direction) of the finger units 10A, 10B and 10C. The protrusion 11b protrudes inward the finger units 10A, 10B and 10C from the outside thereof. A tip portion of the protrusion 11b is formed in a linear shape to extend from a base end portion side thereof to a tip portion side thereof. Thus, a cross section taken when the first knuckle section 11 is cut along a plane orthogonal to the length direction thereof shows a state where the protrusion 11b is pointed. In this way, as the protrusion 11b having the shape that the pointed portion extends toward the tip portion side from the base end portion side is provided, it is possible to prevent shift of the finger units 10A, 10B and 10C in the width direction in holding the object, to thereby more reliably hold the object. Here, the cross-sectional shape of the protrusion 11b is not limited to the above-described pointed shape, and for example, may be a round shape or a flat shape.

The second knuckle section 12 includes a contact member 12a that is in contact with an object. The contact member 12a is made of an elastically deformable material, for example. Accordingly, the contact member 12a is easily deformed when the inside of the finger units 10A, 10B and 10C is pressed against the object, which makes it possible to be in contact with the object at a large area. The contact member 12a may be configured to have a hollow portion on the inside thereof. Accordingly, the amount of deformation in a case where the contact member 12a is pressed against the object is increased.

Figure 2:
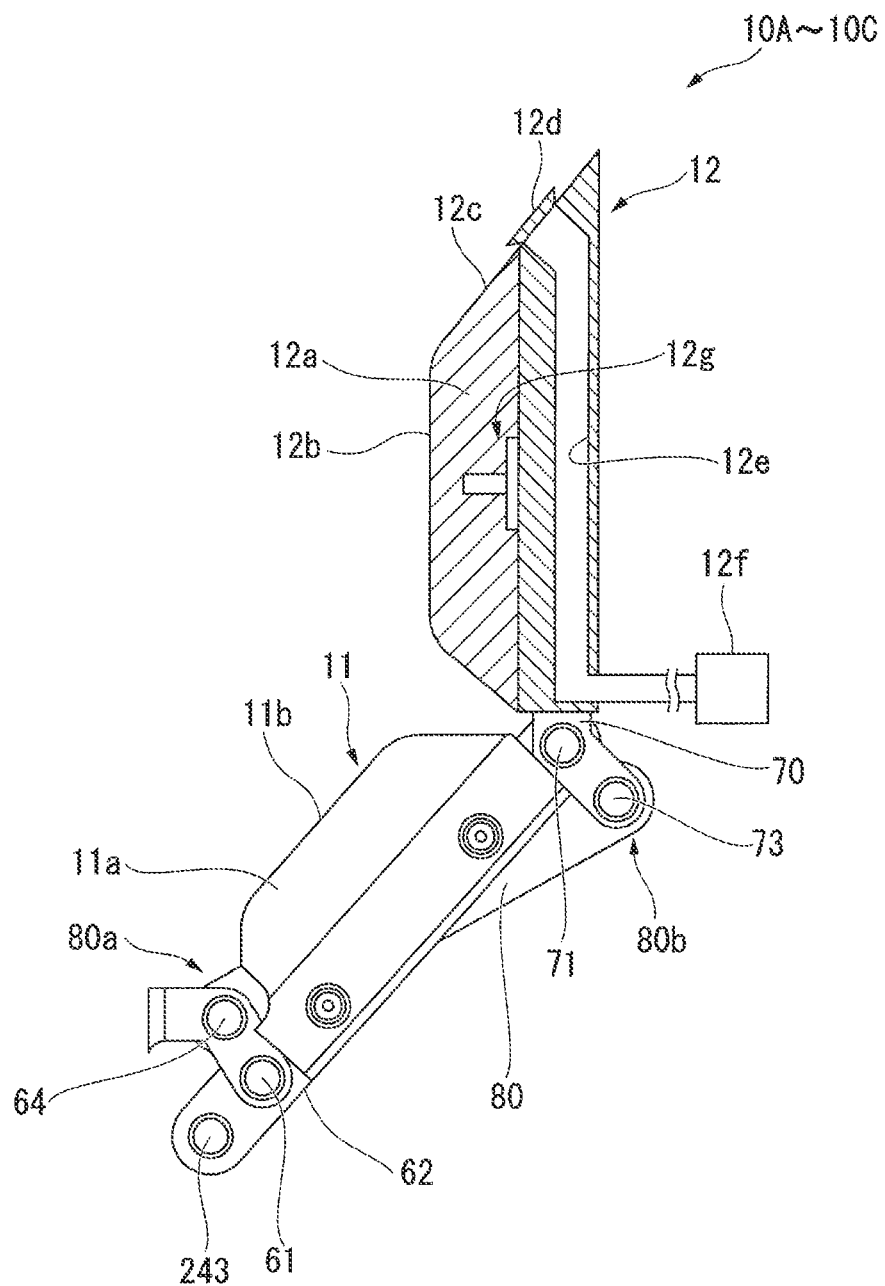
FIG. 2 is a side view illustrating a configuration of a finger unit of the robot hand according to the first embodiment.

FIG. 2 is a side view illustrating an enlarged configuration of the finger units 10A, 10B and 10C. In FIG. 2, only the contact member 12a is shown in its cross section.

As shown in FIG. 2, a pressure sensor 12g is disposed inside the contact member 12a. In a case where the contact member 12a is pressed against the object, the pressure sensor 12g outputs a large electric signal based on the amount of deformation of the contact member 12a. The output result is transmitted to a controller (not shown), for example. As the pressure sensor 12g is provided, it is possible to detect a force applied to the finger units 10A, 10B and 10C and to control a force applied to the object with high accuracy.

As shown in FIGS. 1 and 2, the contact member 12a includes a protrusion 12b at a central portion in a width direction (short direction) of the finger units 10A, 10B and 10C. The protrusion 12b protrudes inward the finger units 10A, 10B and 10C from the outside thereof. A tip portion of the protrusion 12b is formed in a linear shape. Thus, a cross section taken when the second knuckle section 12 is cut along a plane orthogonal to the length direction thereof shows a state where the protrusion 12b is pointed. In this way, as the protrusion 12b is provided, it is possible to prevent shift of the finger units 10A, 10B and 10C in the width direction in holding the object, to thereby more reliably hold the object. Here, the cross-sectional shape of the protrusion 12b is not limited to the above-described pointed shape, and for example, may be a round shape or a flat shape.

A contact surface 12c that is in contact with an object is formed at a tip portion (corresponding to a nail portion) of the contact member 12a. The contact surface 12c is formed to be flat, and is inclined to the outside of the finger units 10A, 10B and 10C with respect to the extending direction of the protrusion 12b. An attracting pad 12d is provided on the contact surface 12c. The attracting pad 12d is disposed to protrude on the contact surface 12c.

As shown in FIG. 2, the attracting pad 12d is connected to a pressure adjusting section 12f through a drawing-in path 12e. The pressure adjusting section 12f is able to adjust pressure of the attracting pad 12d. By adjusting the pressure of the attracting pad 12d in the pressure adjusting section 12f, it is possible to adjust an attracting force, adsorption attraction and release time or the like in the attracting pad 12d.

The attracting pad 12d attracts a flexible member of a thin sheet shape such as a bag or a film. Using the attracting pad 12d, it is possible to retain components of the finger units 10A, 10B and 10C. For example, in a state where two sheets of flexible members of a thin sheet shape such as a bag or a film are overlapped, by attracting two sheets using the respective attracting pads 12d provided in two among the finger units 10A, 10B and 10C with two sheets being interposed therebetween and by shifting, in this state, two finger units in a direction that is parallel to a stacking plane of the flexible members, it is possible to separate two flexible members. Thus, it is possible to perform an opening operation of an opening portion of the bag using the finger units 10A, 10B and 10C, for example.

The support section 20 includes an upper connection base plate 21, a lower connection base plate 22, and a fixed base plate 23. Each of the finger units 10A, 10B and 10C is supported to be rotatable by the fixed link 13. The fixed link 13 is a rigid member that connects the drive section 30 and a support member 62 of each of the finger units 10A, 10B and 10C. Specifically, the fixed link 13 includes a first fixed link 13A that is provided in the first finger unit 10A, and a second fixed link 13B and a third fixed link 13C that are respectively provided in the second finger unit 10B and the third finger unit 10C.

Figure 3:
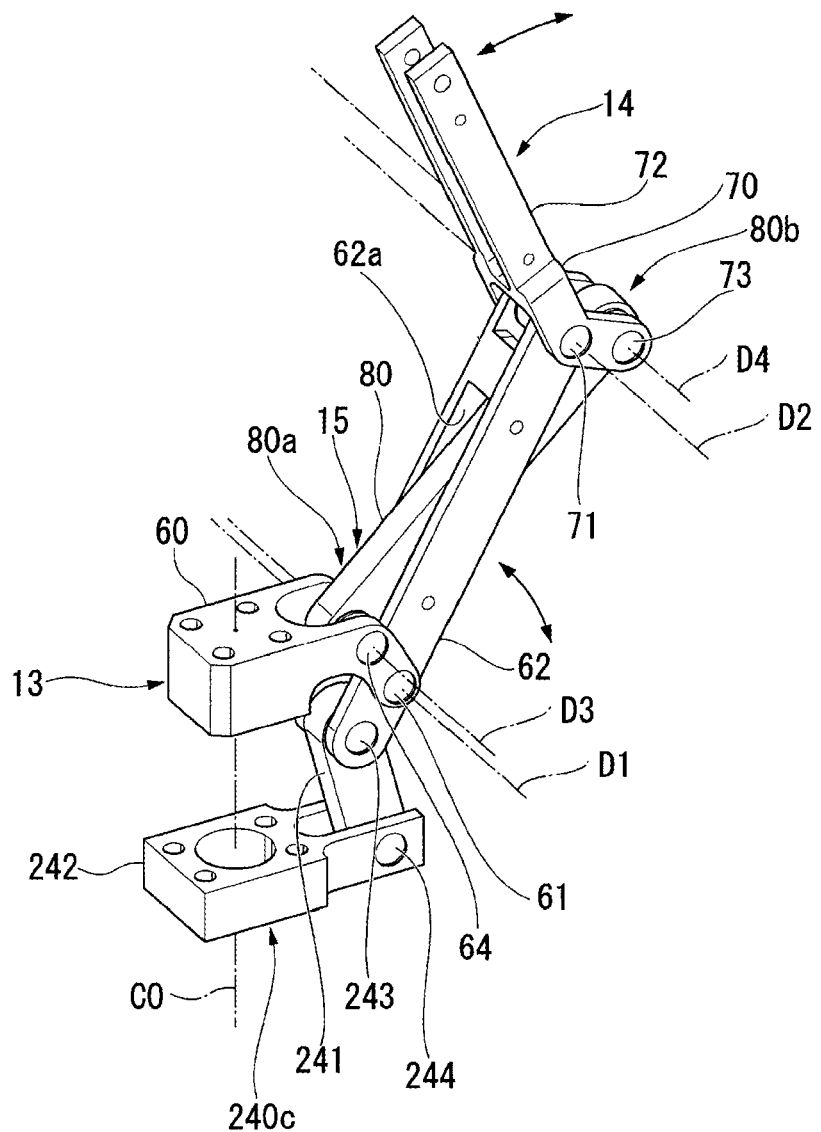
FIG. 3 is a perspective view illustrating a configuration of a part of the finger unit of the robot hand according to the first embodiment.

FIG. 3 is a perspective view illustrating a configuration of the fixed link 13, the tip link 14 and the connection link 15.

As shown in FIGS. 1 and 3, the fixed link 13 includes the first fixed link 13A, the second fixed link 13B and the third fixed link 13C connected to the respective finger units 10A, 10B and 10C.

The first fixed link 13A is fixed in a state of being interposed between the fixed base plate 23 and the upper connection base plate 21. The first fixed link 13A is configured so as not to move in an up-down direction and in the turning direction around the hand axis O. The first fixed link 13A is fixed by a fixing member 16a.

The second fixed link 13B and the third fixed link 13C are interposed between the fixed base plate 23 and the upper connection base plate 21, and are configured so as not to move in the up-down direction. In this point, the second fixed link 13B and the third fixed link 13C are the same as the first fixed link 13A. On the other hand, base ends of the second fixed link 13B and the third fixed link 13C are respectively pivotally supported by finger rotation shafts 324A and 324B (to be described later) of the drive section 30, and are provided to be rotatable around the finger rotation shafts 324A and 324B. In this point, the second fixed link 13B and the third fixed link 13C are different from the first fixed link 13A.

The fixing member 16a and upper end portions 16b and 16c of the finger rotation shafts 324A and 324B are provided so as not to be protruded on a planar surface portion 23a formed on the upper surface of the fixed base plate 23. That is, the planar surface portion 23a of the fixed base plate 23 is formed in a flat state. Accordingly, in the planar surface portion 23a of the fixed base plate 23, it is possible to support an object on a flat support surface. The planar surface portion 23a is formed in the state of a high frictional coefficient compared with the surfaces of the finger units 10A, 10B and 10C. According to this configuration, the object supported on the planar surface portion 23a barely slides, thereby making it possible to stably retain the object.

The fixed link 13 includes a fixed member 60 fixed to the support section 20, and a first shaft 61 that is provided integrally with the fixed member 60 and is parallel to a tangential direction of a virtual circle that is a turning orbit around the hand axis O. The first shaft 61 is formed in a cylindrical shape and extends in the tangential direction. The support member 62 that supports the first knuckle section 11 is connected to the first shaft 61. The support member 62 is connected to be rotatable around an axial line of a central axis D1 of the first shaft 61. The support member 62 is fixed to the first knuckle section 11 through a fixing member 17 (see FIG. 1). Accordingly, as the support member 62 rotates, the first knuckle section 11 rotates integrally with the support member 62 around the axial line of the first shaft 61.

The tip link 14 includes a connection member 70 that is connected to the support member 62, and a second shaft 71 that is parallel to an axial direction of the central axis D1 of the first shaft 61. The second shaft 71 is formed in a cylindrical shape, and extends in the axial direction. A support member 72 that supports the second knuckle section 12 is connected to the second shaft 71. The support member 72 is connected to be rotatable around an axial line of a central axis D2 of the second shaft 71. The support member 72 is fixed to the second knuckle section 12 through a fixing member 18 (see FIG. 1). Accordingly, as the support member 72 rotates, the second knuckle section 12 rotates integrally with the support member 72 around the axial line of the second shaft 71.

The fixed link 13 is configured so that a base end of the support member 62 and a connection plate 241 are provided to be rotatable around a first joint section 243 and the connection plate 241 and a connection member 242 are provided to be rotatable around a second joint section 244. Further, a base end 240c of the connection member 242 that is disposed on an opposite side to the second joint section 244 is supported on the lower connection base plate 22.

The first fixed link 13A is configured so that a portion of the connection member 242 that is disposed on the opposite side to the side thereof on which the second joint section 244 is provided is fixed to a ball nut 312 (to be described later) of the drive section 30. The second fixed link 13B and the third fixed link 13C are pivotally supported by the finger rotation shafts 324A and 324B of the drive section 30 that pass through the lower connection base plate 22, and are installed to be rotatable around these rotation shafts.

The connection link 15 connects the fixed link 13 and the tip link 14. The connection link 15 includes a connection member 80. A connection shaft 64 that is parallel to the axial direction of the central axis D1 of the first shaft 61 is provided to the fixed link 13, and an end portion 80a on the base end side of the connection member 80 is connected to the connection shaft 64. The end portion 80a is connected to be rotatable around an axial line of a central axis D3 of the connection shaft 64. Further, a connection shaft 73 that is parallel to the axial direction of the central axis D2 of the second shaft 71 is provided to the tip link 14, and an end portion 80b on the tip side of the connection member 80 is connected to the connection shaft 73. The end portion 80b is connected to be rotatable around an axial line of a central axis D4 of the connection shaft 73. The connection member 80 is provided to pass through an opening portion 62a formed in the support member 62.

Further, as shown in FIG. 1, the drive section 30 includes the opening and closing mechanism 30A that synchronously opens and closes three finger units 10A, 10B and 10C, and the turning movement section 30B that simultaneously turns the second finger unit 10B and the third finger unit 10C in the circumferential direction. Main components of the opening and closing mechanism 30A and the turning movement section 30B are arranged on a drive base plate 31 having a planar surface in a direction that is orthogonal to the hand axis O under the lower connection base plate 22. The drive section 30 is accommodated in a cylindrical cover body (not shown), for example.

Figure 6:
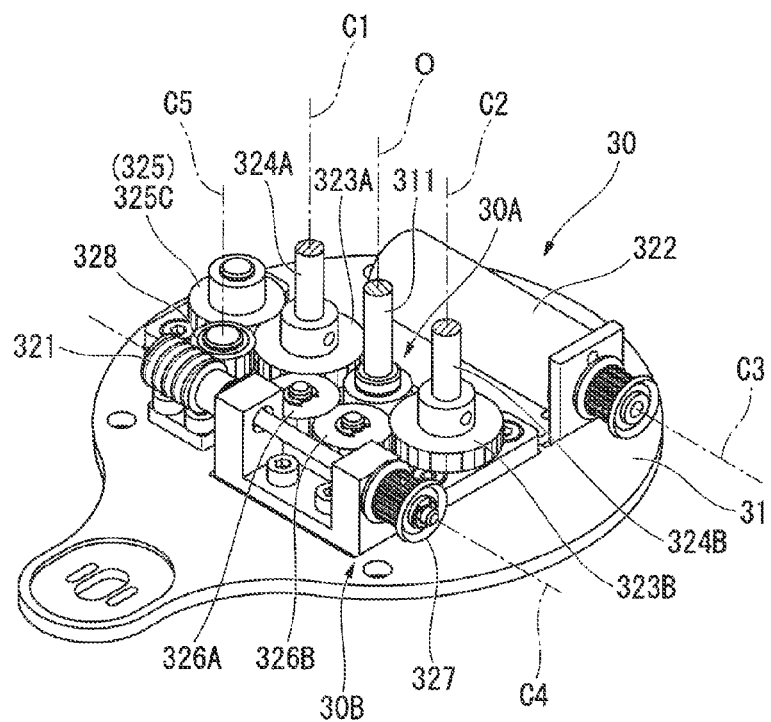
FIG. 6 is a perspective view illustrating an overall configuration of a rotation mechanism of the robot hand according to the first embodiment.
Figure 7:
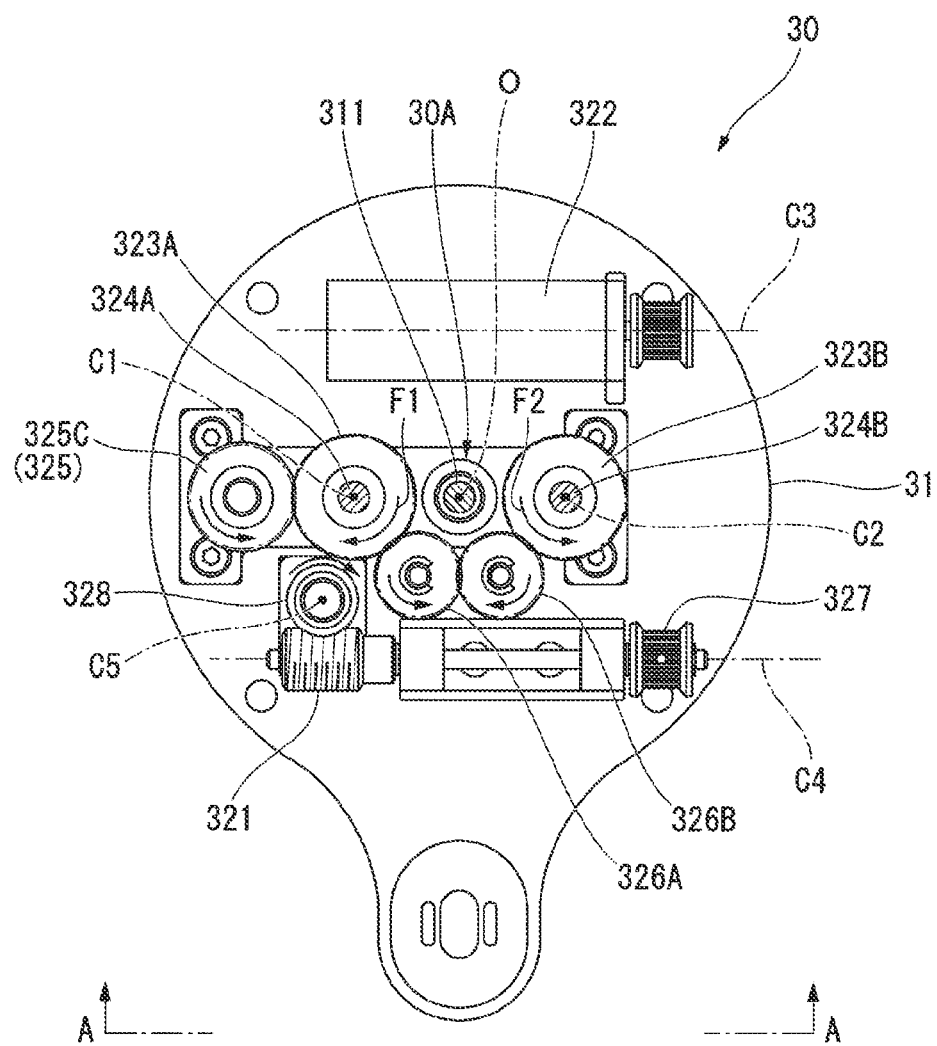
FIG. 7 is a plan view illustrating a configuration of the rotation mechanism of the robot hand according to the first embodiment.
Figure 8:
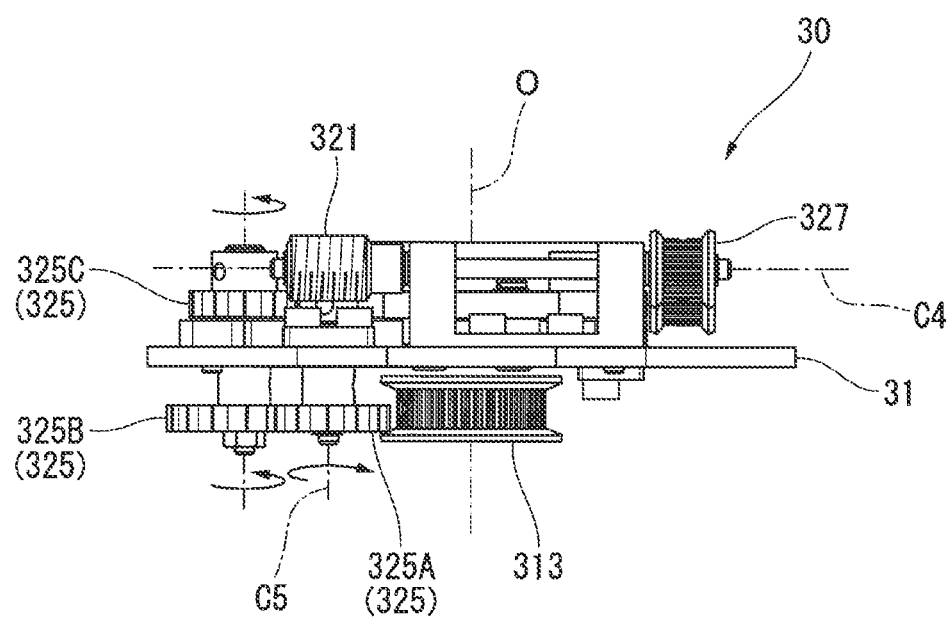
FIG. 8 is a side view illustrating a configuration of the rotation mechanism of the robot hand according to the first embodiment.
Figure 9:
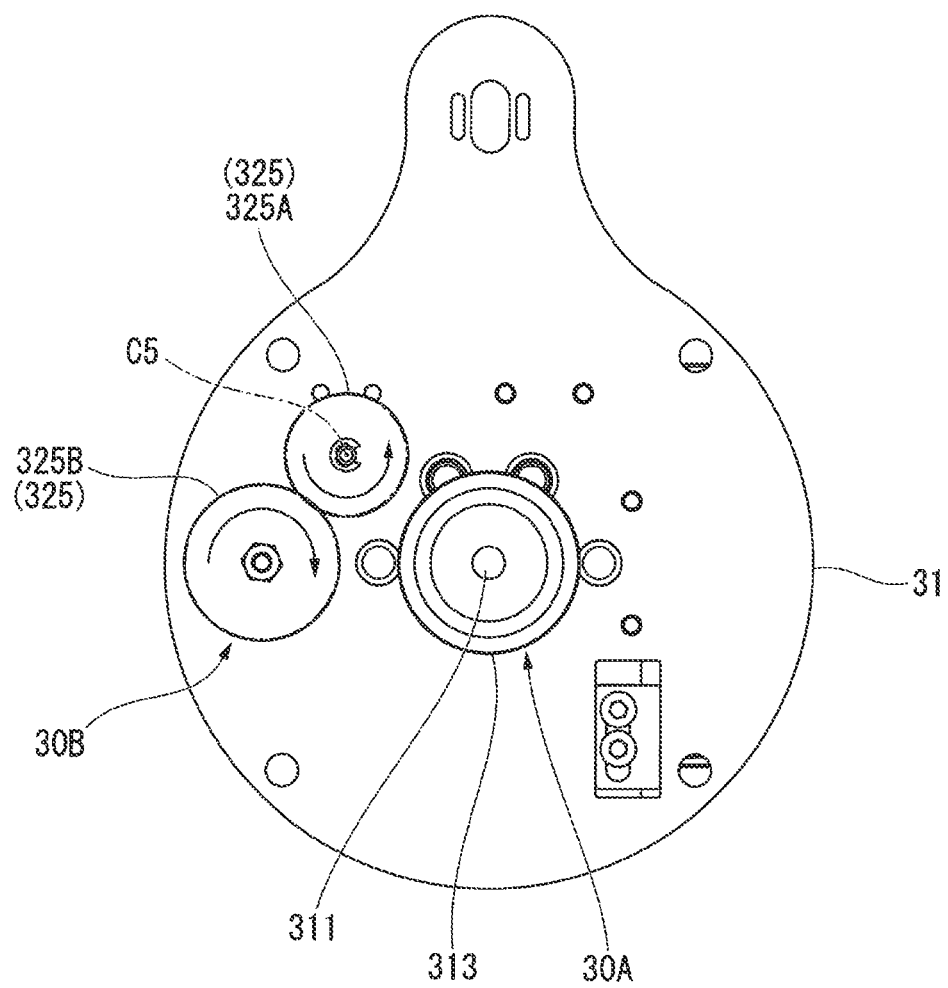
FIG. 9 is a plan view illustrating a configuration of the rotation mechanism of the robot hand according to the first embodiment.

As shown in FIG. 1, the opening and closing mechanism 30A includes a bolt 311 (see FIG. 6) of a ball screw that is supported by the drive base plate 31 on the hand axis O to be rotatable around a predetermined screw shaft, and a ball nut 312 that is screw-coupled with the bolt 311 and moves up and down along the bolt 311, a pulley 313 (see FIG. 8) that is coaxially provided at a lower end of the bolt 311 passed through the drive base plate 31, and a first drive motor 314 that transmits rotation to the pulley 313 through a belt or the like. The ball nut 312 is provided integrally with the lower connection base plate 22.

If the rotation is transmitted to the pulley 313 from the first drive motor 314, the bolt 311 rotates together with the pulley 313, and thus, the lower connection base plate 22 that is provided integrally with the ball nut 312 moves up and down. Then, if the connection member 242 of the fixed link 13 of which the base end is provided to the lower connection base plate 22 moves up and down, the position of the first joint section 243 of the connection plate 241 varies in the radial direction, and thus, the support member 62 of the finger units 10A, 10B and 10C rotates around the first shaft 61 to perform the opening and closing operation.

Figure 4:
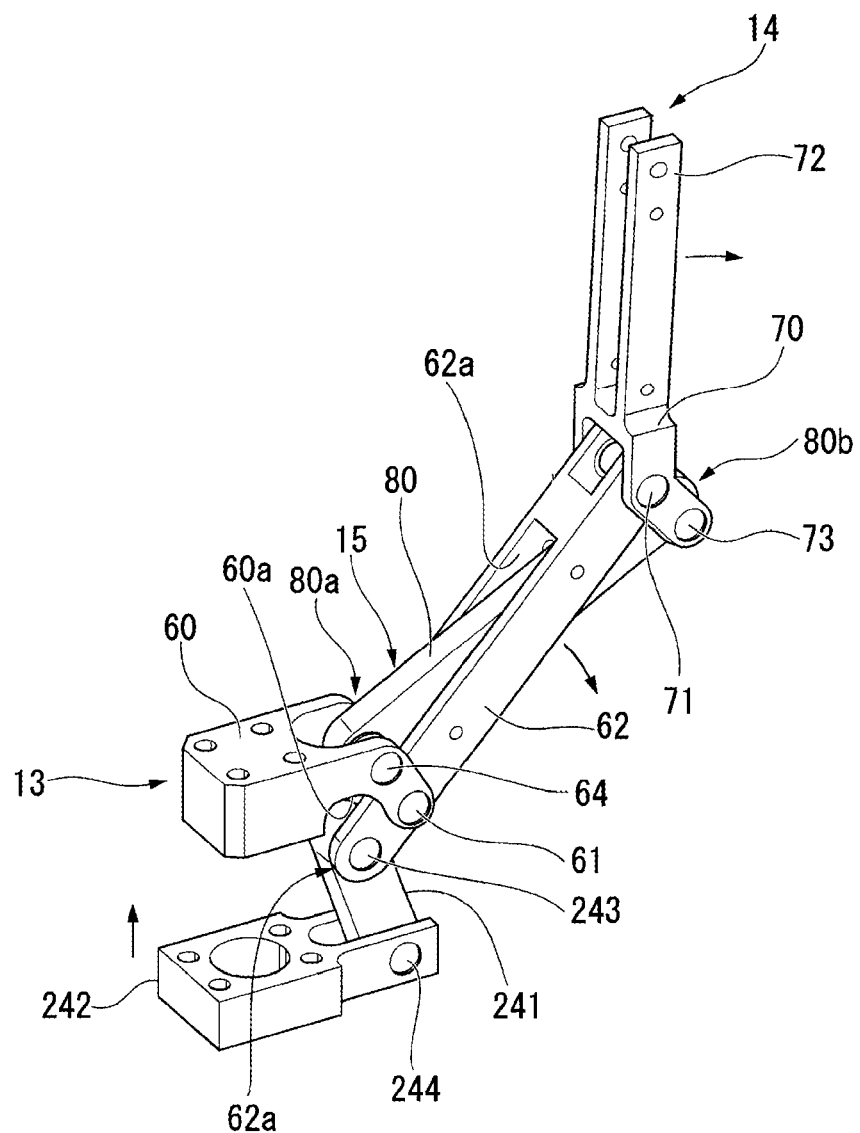
FIG. 4 is a perspective view illustrating an operation of the finger unit of the robot hand according to the first embodiment.

For example, in the case of the opening operation of the finger units 10A, 10B and 10C, the lower connection base plate 22 and the connection member 242 move up as shown in FIG. 4, and thus, the first joint section 243 of the connection plate 241 moves up. Thus, the support member 62 rotates around the first shaft 61 in a clockwise direction in the figure. Due to the rotation of the support member 62, a rotational force is transmitted to the second shaft 71 in the clockwise direction in the figure. The rotational force is applied to the connection member 80 through the second shaft 71 and the connection shaft 73, and thus, the connection member 80 rotates integrally with the rotation of the support member 62 around the connection shaft 64 in the clockwise direction in the figure.

Since the connection shaft 64 that is a rotation center of the connection member 80 is fixed above and radially inside the first shaft 61 that is a rotation center of the support member 62, in a case where the connection member 80 rotates in the clockwise direction, the orbit of the end portion 80b of the connection member 80 enters inside the orbit of the tip (second shaft 71) of the support member 62. Thus, the connection shaft 73 of the connection member 70 is pulled in the clockwise direction in the figure by the connection member 80, and thus, the connection member 70 rotates around the second shaft 71 in the clockwise direction in the figure. Thus, the second knuckle section 12 connected to the connection member 70 rotates in association with and in the same direction as the rotation of the first knuckle section 11 fixed to the support member 62.

Figure 5:
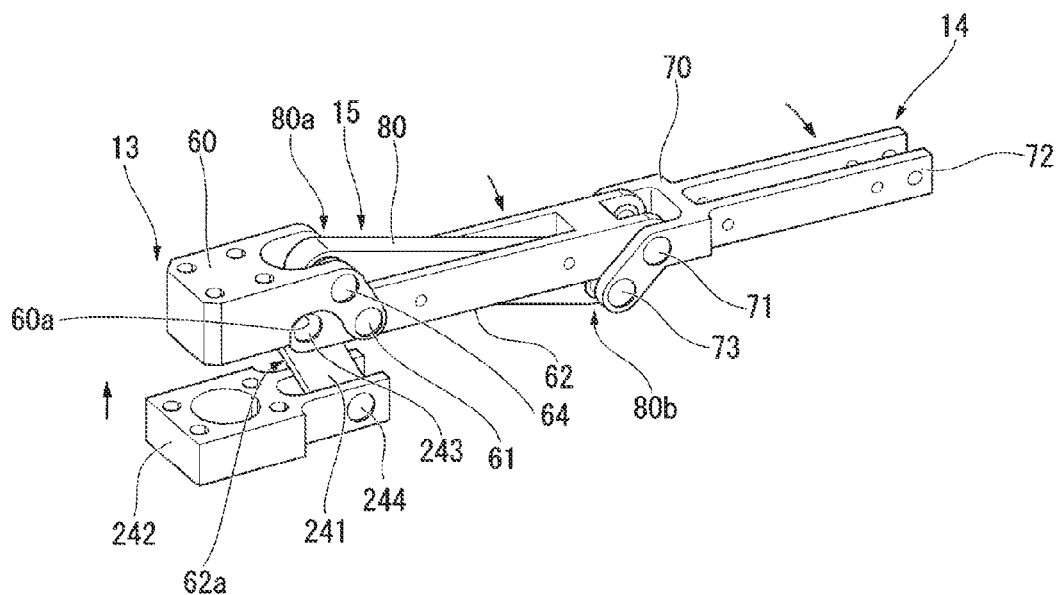
FIG. 5 is a perspective view illustrating an operation of the finger unit of the robot hand according to the first embodiment.

In a case where the support member 62 and the connection member 70 rotate to form an angle of 180°, as shown in FIG. 5, the end portion 62a on the base end side of the support member 62 is locked in a locking portion 60a on a lower side of the fixed member 60. Thus, the support member 62 and the connection member 70 are prevented from being excessively opened. In a case where the support member 62 and the connection member 70 form the angle of 180°, the first knuckle section 11 and the second knuckle section 12 are arranged in a straight line shape. Thus, it is possible to uniformly support a flat portion of the object by the first knuckle section 11 and the second knuckle section 12. In this case, it is also possible to uniformly support the flat portion of the object between the first and second knuckle sections 11 and 12 and the planar surface portion 23a of the fixed base plate 23. In a case where the finger units 10A, 10B and 10C are closed, the first knuckle section 11 and the second knuckle section 12 are arranged so as to protrude upward in the extending direction of the hand axis O with respect to the planar surface portion 23a of the fixed base plate 23.

Further, in the case of the closing operation of the finger units 10A, 10B and 10C in the state shown in FIG. 5, the lower connection base plate 22 and the connection member 242 move down, and thus, the first joint section 243 of the connection plate 241 moves down. Thus, the support member 62 rotates around the first shaft 61 in the counterclockwise direction in the figure. Due to the rotation of the support member 62, a rotational force in the counterclockwise direction in the figure is transmitted to the second shaft 71. The rotational force is applied to the connection member 80 through the second shaft 71 and the connection shaft 73, and thus, the connection member 80 rotates integrally with the rotation of the support member 62 around the connection shaft 64 in the counterclockwise direction in the figure.

In a case where the connection member 80 rotates in the counterclockwise direction, the orbit of the end portion 80b of the connection member 80 rotates to go outside the orbit of the tip (second shaft 71) of the support member 62. Thus, the connection shaft 73 of the connection member 70 is pressed in the counterclockwise direction in the figure by the connection member 80, and thus, the connection member 70 rotates around the second shaft 71 in the counterclockwise direction in the figure. Thus, the second knuckle section 12 connected to the connection member 70 rotates in association with and in the same direction as the rotation of the first knuckle section 11 fixed to the support member 62.

In this way, the connection link 15 connects the first knuckle section 11 and the second knuckle section 12 so that the rotation of the support member 62 (and also the first knuckle section 11) and the rotation of the connection member 70 (and also the second knuckle section 12) are performed in association in the same direction. Accordingly, in a case where the finger units 10A, 10B and 10C are opened, the second knuckle section 12 is extended with respect to the first knuckle section 11, in association with the opening operation of the first knuckle section 11. Further, in a case where the finger units 10A, 10B and 10C are closed, the second knuckle section 12 is bent with respect to the first knuckle section 11, in association with the closing operation of the first knuckle section 11.

Further, as shown in FIGS. 6 to 9, the turning movement section 30B has a schematic configuration that includes a worm gear 321, a second drive motor 322 that rotates the worm gear 321, a pair of rotation shaft spur gears 323 (323A and 323B) of the same shape that respectively rotate in different directions from each other around rotation axes C1 and C2 that are parallel to the hand axis O in association with the rotation of the worm gear 321 to turn the second finger unit 10B and the third finger unit 10C, the finger rotation shafts 324A and 324B that extend upward with respect to the respective rotation shaft spur gears 323A and 323B, and a transmission spur gear 325 that transmits rotational power to the pair of rotation shaft spur gears 323A and 323B from the worm gear 321.

The worm gear 321 has a cylindrical shape, and has spiral teeth on a curved surface portion of a side surface thereof.

Here, a part of the turning movement section 30B excluding the finger rotation shafts 324A and 324B is referred to as a "power section G". The power section G is disposed under the support section 20.

The first rotation shaft spur gear 323A that is one of the pair of rotation shaft spur gears 323 is provided with the finger rotation shaft 324A, the upper connection base plate 21, the lower connection base plate 22, the second fixed link 13B, and the second finger unit 10B via the second fixed link 13B; and the second rotation shaft spur gear 323B, the other one, that rotates in the different direction from the first rotation shaft spur gear 323A is provided with the finger rotation shaft 324B, the upper connection base plate 21, the lower connection base plate 22, the third fixed link 13C, and the third finger unit 10C via the third fixed link 13C. As the second drive motor 322 rotates, the second finger unit 10B and the third finger unit 10C rotate in a direction of being close to or distant from each other. That is, the second finger unit 10B and the third finger unit 10C are able to turn between the first finger position P1 and the second finger position P2 as described above.

The second drive motor 322 and the worm gear 321 are respectively disposed on the drive base plate 31, in which respective rotation axes C3 and C4 thereof are horizontally provided in parallel. A pulley 327 is coaxially provided to the worm gear 321 on the rotation axis C4. Rotation of the second drive motor 322 is transmitted to the pulley 327.

Further, a worm wheel 328 that is engaged with the worm gear 321 and rotates around a vertical axis (rotation axis C5) that is orthogonal to the rotation axis C4 is provided on the drive base plate 31. A first transmission spur gear 325A that is disposed under the drive base plate 31 is coaxially provided at a lower end of the rotation axis C5 of the worm wheel 328. Further, a second transmission spur gear 325B is provided to be engaged with the first transmission spur gear 325A to rotate in a different direction from the first transmission spur gear 325A, and a third transmission spur gear 325C is provided coaxially with the second transmission spur gear 325B above the drive base plate 31. The first rotation shaft spur gear 323A is engaged with the third transmission spur gear 325C to rotate in a different direction from the third transmission spur gear 325C.

The worm wheel 328 has a disc shape, and has arc-shaped teeth on a curved surface portion of a side surface thereof.

The first rotation shaft spur gear 323A and the second rotation shaft spur gear 323B respectively have a tooth shape of the same pitch, and are supported to be rotatable by the drive base plate 31 with an interval therebetween being constantly maintained. The rotation axes C1 and C2 thereof are arranged at symmetrical positions with the bolt 311 of the ball screw being interposed therebetween.

A pair of synchronous spur gears 326A and 326B of the same shape are provided between the first rotation shaft spur gear 323A and the second rotation shaft spur gear 323B. That is, the first rotation shaft spur gear 323A is engaged with the first synchronous spur gear 326A, and the second synchronous spur gear 326B that is engaged with the first synchronous spur gear 326A is engaged with the second rotation shaft spur gear 323B. Thus, the rotation of the first rotation shaft spur gear 323A is transmitted to the second rotation shaft spur gear 323B in association.

In a case where the pair of synchronous spur gears 326A and 326B rotate with the same number of rotations, the rotational directions of the first rotation shaft spur gear 323A and the second rotation shaft spur gear 323B are different from each other, but the rotational angles thereof are the same. Thus, the finger rotation shafts 324A and 324B rotate in the different directions with the same number of rotations, and thus, the second finger unit 10B and the third finger unit 10C that are respectively provided to the finger rotation shafts 324A and 324B also rotate in the different directions with the same angle.

In this regard, the pitches of the rotation shaft spur gears 323 with respect to the second finger unit 10B and the third finger unit 10C may be formed to be different from each other. Thus, in a case where the first rotation shaft spur gear 323A and the second rotation shaft spur gear 323B rotate with the same number of rotations, the rotational angle where the second finger unit 10B rotates according to the rotation of the first rotation shaft spur gear 323A and the rotational angle where the third finger unit 10C rotates according to the rotation of the second rotation shaft spur gear 323B may be different from each other. According to this configuration, it is possible to hold a special shape such as asymmetry.

In a case where the second finger unit 10B and the third finger unit 10C are turned, the second drive motor 322 is first operated in the turning movement section 30B of the drive section 30, and then, the pulley 327 that is connected to the second drive motor 322 by a belt or the like rotates around the rotation axis C4. Then, the worm gear 321 that is provided coaxially with the pulley 327 rotates around the rotation axis C4, and this rotation is transmitted to the worm wheel 328 that rotates around the rotation axis C5 that is parallel to the hand axis O. Then, the rotation is sequentially transmitted to the first transmission spur gear 325A that is provided coaxially with the worm wheel 328, the second transmission spur gear 325B and the third transmission spur gear 325C, and thus, the first rotation shaft spur gear 323A that is engaged with the third transmission spur gear 325C rotates.

Then, the rotation of the first rotation shaft spur gear 323A is transmitted to the second rotation shaft spur gear 323B through the pair of synchronous spur gears 326A and 326B. At this time, in a case where the first rotation shaft spur gear 323A, one of the pair, rotates right (in an arrow F1 direction) in a planar view of FIG. 7, the second rotation shaft spur gear 323B, the other of the pair, rotates left (in an arrow F2 direction). That is, the first rotation shaft spur gear 323A and the second rotation shaft spur gear 323B rotate in the different directions. Further, the finger rotation shafts 324A and 324B that are provided coaxially with the first rotation shaft spur gear 323A and second rotation shaft spur gear 323B also respectively rotate right (in the arrow F1 direction) and left (in the arrow F2 direction) in association with the rotation shaft spur gears. Further, the second finger unit 10B and the third finger unit 10C are turned together with the finger rotation shafts 324A and 324B.

Next, an operation of the opening and closing mechanism 30A will be described.

The first drive motor 314 and the pulley 313 are connected to each other by a belt or the like. If the pulley 313 rotates by driving of the first drive motor 314, the bolt 311 of the ball screw that extends along the hand axis O that is provided coaxially with the pulley 313 rotates, and thus, the ball nut 312 moves up and down along the bolt 311. At the same time, the lower connection base plate 22 that is provided integrally with the ball nut 312 also relatively moves up and down with respect to the bolt 311. Further, since the finger units 10A, 10B and 10C are supported on the lower connection base plate 22, the finger units 10A, 10B and 10C perform the opening and closing operation in association through the fixed link 13, the tip link 14 and the connection link 15 according to the up and down movement of the lower connection base plate 22.

Next, an operation of the above-mentioned robot hand 100 will be described in detail.

In the robot hand 100 of the present embodiment, it is possible to circumferentially turn each of two finger units 10B and 10C capable of being turned, approximately around the hand axis O, in a large circumferential range of 180° or greater according to the shape of an object, and thus, it is possible to appropriately change an object holding direction of the respective finger units 10A, 10B and 10C. For example, since it is possible to move three finger units 10A, 10B and 10C into aligned finger positions by the turning movement section 30B, by installing the robot hand 100 to each of two arms, it is possible to perform a holding operation of an object such as a rectangular parallelepiped at a stable posture with the object being interposed between the hands (both hands) of two arms.

Further, for example, in a case where the object is a spherical body, it is possible to perform change so that the respective finger units 10A, 10B and 10C surround the object (so that the respective finger units 10A, 10B and 10C are uniformly arranged around the object). On the other hand, in a case where the object is a rod-shaped member, it is possible to perform change so that the object is interposed between the respective finger units 10A, 10B and 10C (so that the respective finger units 10A, 10B and 10C face each other through the object). In this way, by changing the direction of the opening and closing operation of the finger units 10A, 10B and 10C, it is possible to stably hold the spherical body or the rod-shaped member.

In this way, it is possible to realize a holding state that is barely obtained in the related art, to thereby realize various holding states.

Further, according to the robot hand 100 of the present embodiment, the power section that transmits the rotational power to the finger rotation shafts 324A and 324B may be disposed in a space under the support section 20 that does not interfere with the turning finger units. Thus, compared with a case where the power section is disposed in a limited space of the root position (base end position) in the finger units 10A, 10B and 10C, it is possible to install a drive motor of a large output to the robot hand 100, and to secure a large turning range of 180° of the second finger unit 10B and the third finger unit 10C that move in the circumferential direction.

Further, the power section of the turning movement section 30B having a large weight may be disposed at a position that is near the root of the entire robot hand 100, and thus, it is possible to position the weight balance and center of gravity of the robot hand 100 in the root portion. Thus, it is possible to reduce the moment of inertia that acts on the robot hand 100. Thus, control of a manipulator becomes easy, and stability of the control is increased, and thus, it is possible to enhance holding accuracy in the robot hand 100.

Further, according to the robot hand 100 of the present embodiment, the transmission structure that two rotation shaft spur gears 323A and 323B rotate in the synchronized state by one worm wheel 328 is employed, and accordingly, it is possible to change the finger positions of the two finger units 10B and 10C. For example, in the case of the related art in which two worm wheels are used and rotational power is transmitted to a finger unit corresponding to each of two worm wheels, it is necessary to position two worm gears with high accuracy in consideration of engagement of the worm gears in manufacturing the robot hand. However, in the robot hand 100 of the present embodiment, since one worm wheel 328 is used, it is not necessary to perform the positioning of high accuracy in manufacturing the robot hand, to thereby shorten a manufacturing time. Further, it is possible to reduce malfunction.

Further, since one worm wheel 328 is provided to be engaged with the worm gear 321 and the other transmission parts are provided as the spur gears (rotation shaft spur gears 323 and the transmission spur gears 325), it is possible to reduce play due to the worm wheel 328 and to reduce rattling of the turning movement section 30B. Thus, it is possible to stably hold an object with high accuracy.

Further, since two rotation shaft spur gears 323A and 323B rotate at the same angle with the same number of rotations, two finger units 10B and 10C that are connected to the rotation shaft spur gears 323A and 323B similarly rotate at the same angle with the same number of rotations. Thus, a posture control of the object becomes easy.

Further, it is possible to simplify a device configuration, compared with a case where the rotational angles between the plural rotation shaft spur gears are different from each other when the rotation shaft spur gears rotate with the same number of rotations.

Further, even though both the rotation shaft spur gears 323A and 323B are not directly engaged with each other but are disposed to be spaced apart from each other, it is possible to transmit rotation to the second rotation shaft spur gear 323B from the first rotation shaft spur gear 323A by the synchronous spur gears 326A and 326B. Thus, there is an advantage that restriction to arrangement of the finger rotation shafts 324A and 324B that turns the finger units 10B and 10C is reduced.

Furthermore, as the second finger unit 10B and the third finger unit 10C circumferentially rotate in the direction of being close to or distant from each other, it is possible to stably hold an object at a predetermined position by three finger units 10A, 10B and 10C. In this case, when the second finger units 10B and the third finger unit 10C that are disposed at the first finger position P1 rotate with the same number of rotations, the rotational angle at which the second finger unit 10B rotates and the rotational angle at which the third finger unit 10C rotates are equal to each other, and thus, the circumferential positions of the second finger unit 10B and the third finger unit 10C with respect to the first finger unit 10A are at the same distance. Thus, it is possible to more stably hold the object.

As described above, according to the present embodiment, since the rotation of the first knuckle section 11 around the first shaft 61 and the rotation of the second knuckle section 12 around the second shaft 71 are performed in the same direction in association, it is possible to perform the opening and closing operation and the bending operation of the finger units 10A, 10B and 10C in association. In addition, since the opening and closing mechanism 30A is provided that includes the bolt 311 of the ball screw that is supported to be rotatable around a predetermined screw shaft and the ball nut 312 that is screw-coupled with the bolt 311 and moves up and down along the bolt 311, in which the ball nut 312 and the first knuckle section 11 are connected to each other so that the first knuckle section 11 rotates in association with the movement of the ball nut 312, a force applied to the finger units 10A, 10B and 10C may be transmitted (back-drivable) to the first drive motor 314 through the bolt 311, the ball nut 312 and the pulley 313. Thus, for example, by performing control so that a constant torque is output from the first drive motor 314, it is possible to generate a constant force in the finger units 10A, 10B and 10C. Thus, it is possible to stably hold an object. Hence, it is possible to achieve the robot hand 100 that is capable of stably holding various objects having various shapes or sizes in various holding postures of the hand, in a simple manner and at low cost.

Second Embodiment

Hereinafter, a robot hand and a robot device according to another embodiment of the invention will be described referring to the accompanying drawings. Here, the same reference numerals are given to the same or like members and parts as in the above-described first embodiment, and description thereof will be omitted. A configuration that is different from the first embodiment will be described.

Figure 10:
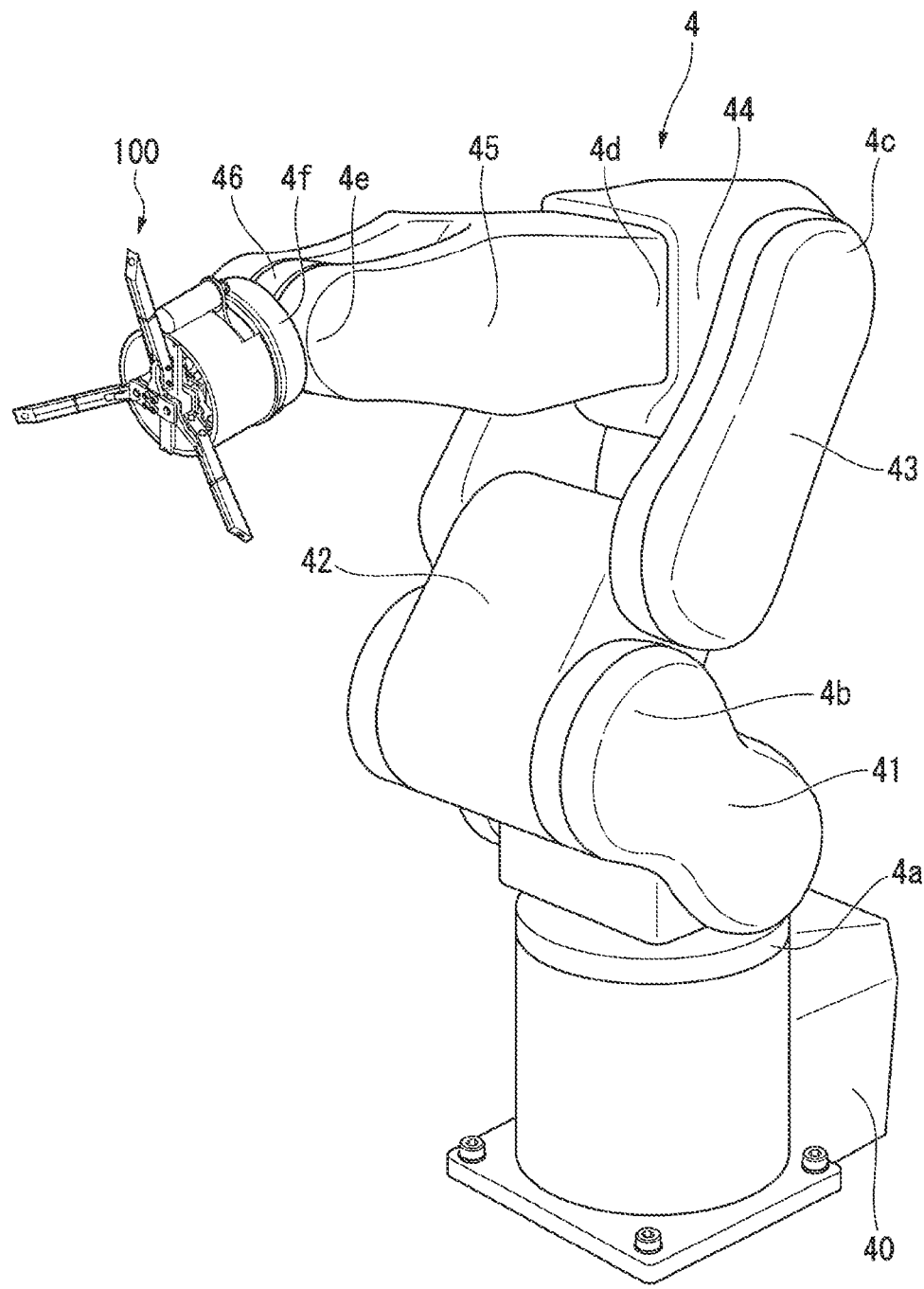
FIG. 10 is a perspective view illustrating an entire configuration of a robot device according to a second embodiment of the invention.

As shown in FIG. 10, a robot device 4 is used as an industrial robot arm, for example. The robot device 4 is provided to a multi-axial arm that includes a mounting section 40, a first link 41, a second link 42, a third link 43, a fourth link 44, a fifth link 45 and a sixth link 46.

The mounting section 40 is mounted to a floor, a wall, a ceiling or the like, for example. The first link 41 to the sixth link 46 are serially connected in the order from the mounting section 40. Further, in the robot device 4 of the present embodiment, the mounting section 40 and the first link 41, and the first link 41 and the other links are connected to each other to be rotatable at connection portions (joints 4a, 4b, 4c, 4d, 4e and 4f). Since the respective links of the first link 41 to the sixth link 46 are provided to be rotatable, as the respective links appropriately rotate at the joints 4a to 4f, it is possible to perform a complex operation in the entire robot arm.

The sixth link 46 corresponds to a tip part of the robot device 4. The robot hand 100 according to the above-described first embodiment is mounted to the tip part of the sixth link 46.

According to the robot device 4 of the second embodiment, it is possible to provide a robot device that is capable of holding various objects having various shapes or sizes, in a simple manner and at low cost.

In the second embodiment, an example of the robot device having six joints is illustrated, but the number of joints is not limited thereto and may be one or more. A robot device may be provided that includes seven or more joints and has a wide range of arm operation.

Third Embodiment

Figure 11:
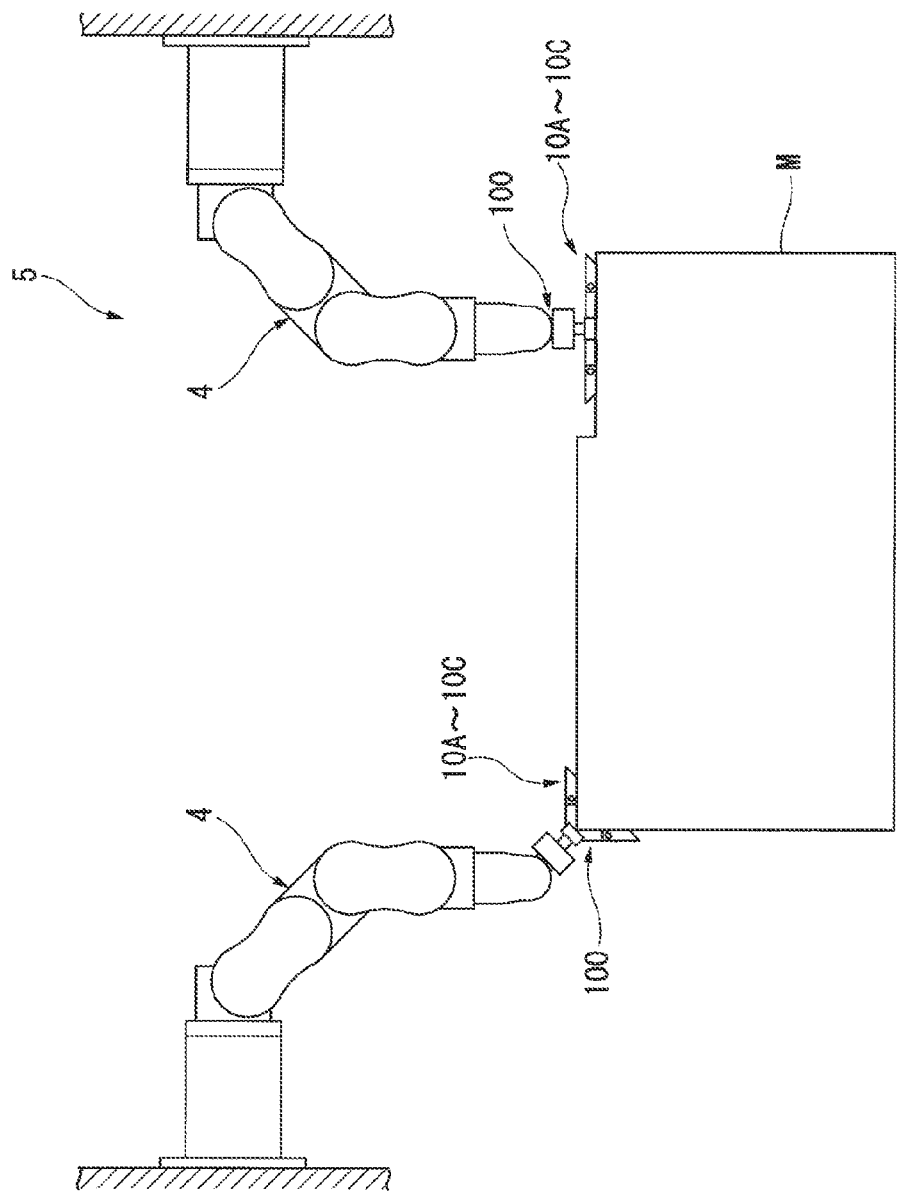
FIG. 11 is a perspective view illustrating an entire configuration of a robot device according to a third embodiment of the invention.

As shown in FIG. 11, a robot device 5 according to a third embodiment is a dual arm robot that is provided with plural (here, two) multi-axial arms (robot devices 4) according to the above-described second embodiment. In this case, the robot hand 100 is provided to each of two arms, and thus, it is possible to perform a holding operation of an object M using the hands of two arms with the object M being interposed therebetween. In this way, it is possible to realize a holding state that is hardly achieved in the related art, and to realize various holding states.

Figure 12:
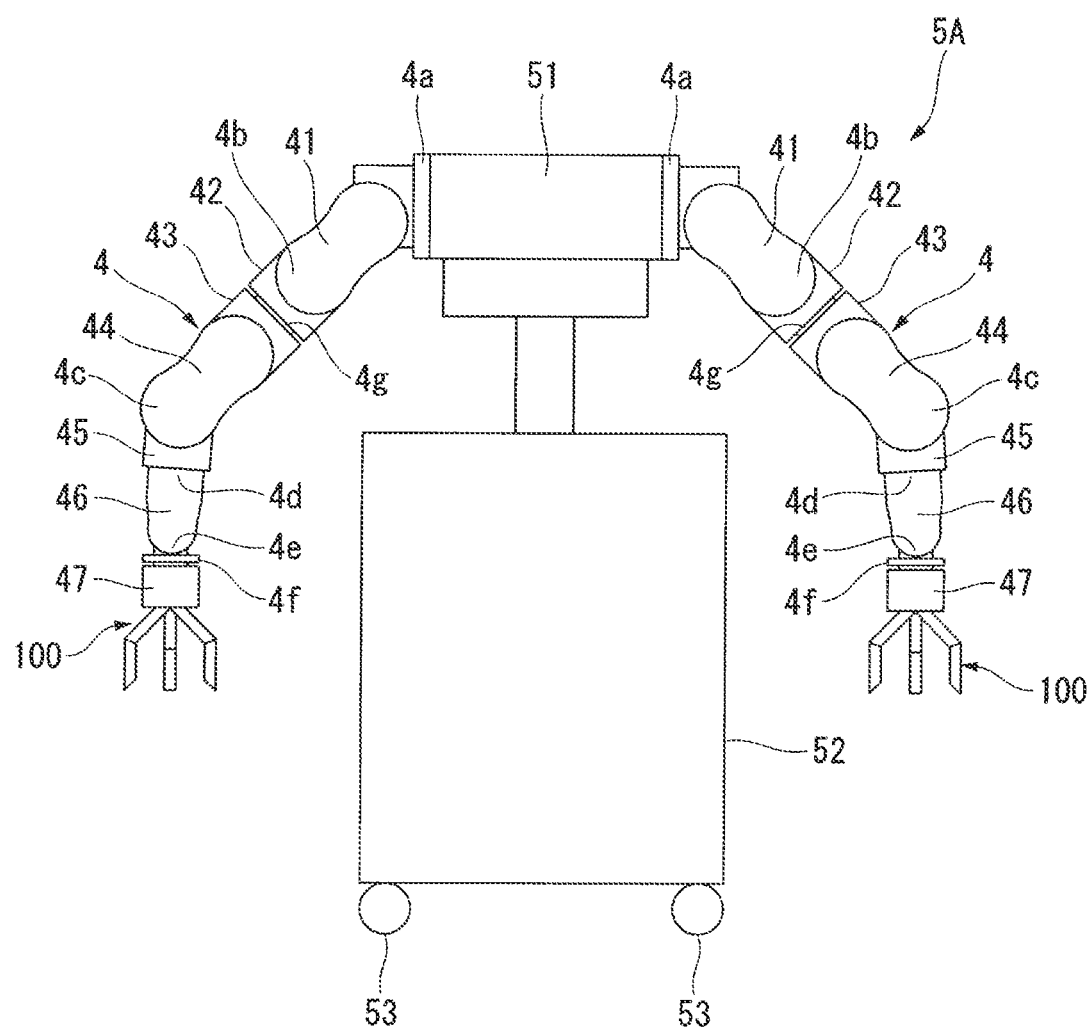
FIG. 12 is a perspective view illustrating an entire configuration of a robot device according to a modification example of the invention.

Further, as shown in a modification example in FIG. 12, a configuration may be provided in which the robot hand 100 is provided to each of two multi-axial arms (robot devices 4) that is provided to a body section 51 of a robot device 5A. Further, if each multi-axial arm 4 is provided as a seven-axis arm having a first link 41 to a seventh link 47 and the robot hand 100 is provided to each multi-axial arm 4, it is possible to realize the same arm operation and holding state as if a human holds a large object using two arms and hands. The robot device 5A of the present embodiment has a configuration of the seven-axis arm as a rotation shaft 4g is provided between joints of reference numerals 4b and 4c among sixth connection portions (joints 4a, 4b, 4c, 4d, 4e and 4f).

In FIG. 12, the robot device 5A is configured so that wheels 53 are provided at a bottom portion thereof and the body section 51 is supported by a main body section 52 that accommodates a control device (not shown), and is movable by the wheels 53.

In this way, according to the embodiments shown in FIGS. 11 and 12, it is possible to hold an large object that is hardly held by one arm (robot hand 100). Further, in the case of holding an object inside a box by two arms (robot devices 4) with the finger units being put into a space between the box and the object, according to a three-finger hand in the related art, it is difficult to put all the finger units into the space in a case where the space is narrow. However, according to the third embodiment, it is possible to put the finger units into the space by aligning the finger tips, and thus, it is possible to firmly hold the object by a large number of finger units compared with the hand in the related art.

Hereinbefore, the robot hand and the robot device according to the embodiments of the invention are described, but the invention is not limited to the above embodiments, and may include various modifications appropriately made in a range without departing from the spirit thereof.

For example, in the above-described embodiments, three finger units 10A, 10B and 10C are provided, but the number of finger units is not limited to three. That is, three or more finger units may be provided as long as at least two or more finger units thereof are provided to be able to turn.

Fourth Embodiment

Next, a fourth embodiment of the invention will be described.

Figure 13:
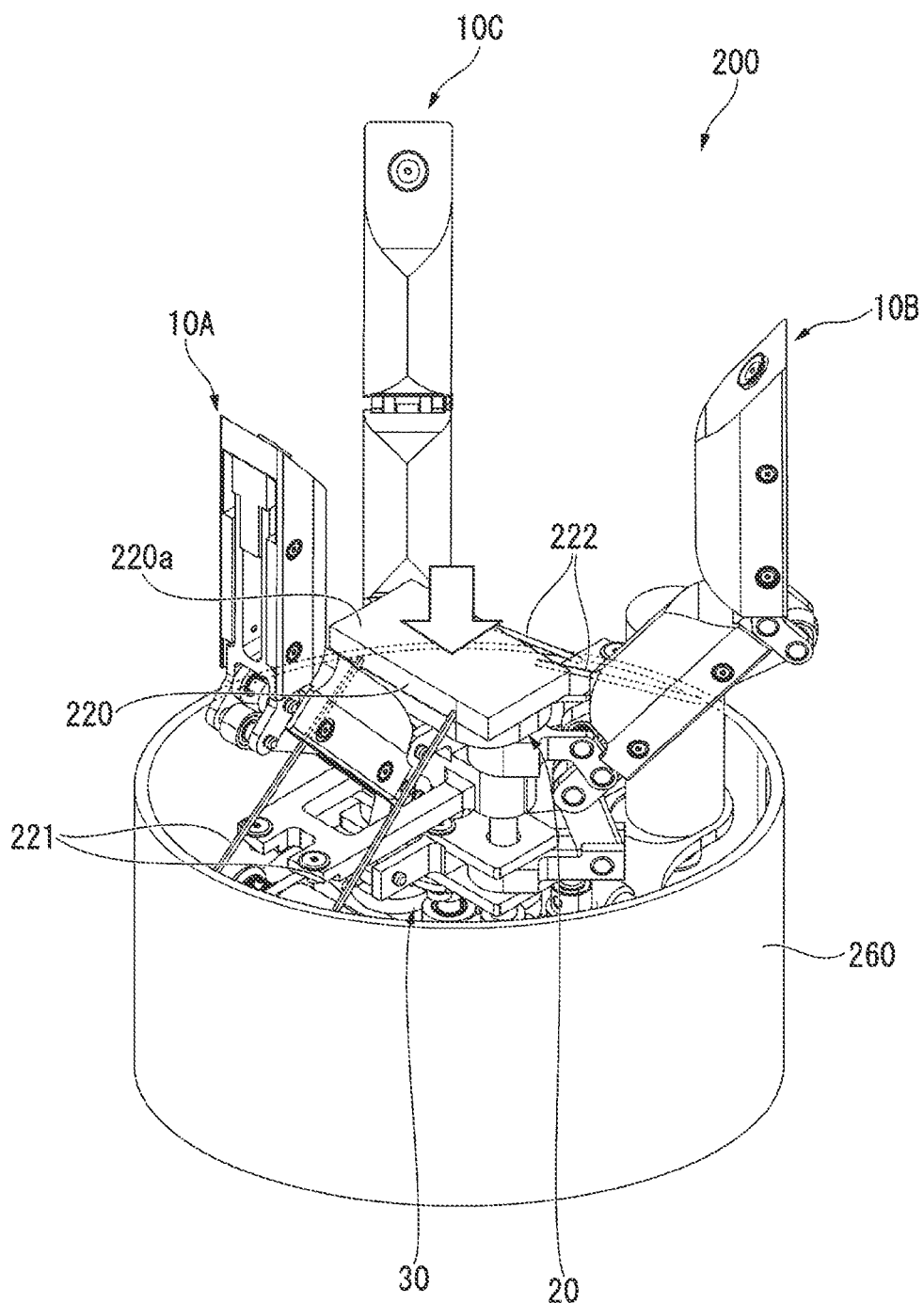
FIG. 13 is a perspective view illustrating an entire configuration of a robot device according to a fourth embodiment of the invention.

FIG. 13 is a perspective view illustrating a configuration of a robot hand 200 according to the present embodiment.

As shown in FIG. 13, the robot hand 200 includes a contact member 220 that is in contact with an object together with the finger units 10A, 10B and 10C, and a cover member 260 that covers the support section 20 and the drive section 30. The other configuration is the same as in the first embodiment.

Beam sections 221 and 222 that support the contact member 220 are provided to the cover member 260. The beam sections 221 are disposed at positions between which the first finger unit 10A is disposed in the circumferential direction of the robot hand 200. Further, the beam sections 222 are disposed between the second finger unit 10B and the third finger unit 10C in the circumferential direction of the robot hand 200. According to this configuration, it is possible to prevent interference of the movement of the finger units 10B and 10C in the circumferential direction of the robot hand 200.

The contact member 220 is fixed to the cover member 260 through the beam sections 221 and 222 and is not in contact with the support section 20. Thus, a force applied to the contact member 220 is transmitted to the cover member 260 through the beam sections 221 and 222, and thus, it is possible to prevent the force from being transmitted to the drive section 30 from the support section 20. Thus, it is possible to stabilize the operation of the finger units 10A, 10B and 10C. The position of the contact member 220 in the height direction of the robot hand 200 is adjusted so that the insides of the finger units 10A, 10B and 10C and a front surface 220a of the contact member 220 form an approximately flush surface in a state where the finger units 10A, 10B and 10C are opened. Thus, it is possible to apply a force to an object or receive a force from an object in a dispersed manner, in the finger units 10A, 10B and 10C and the contact member 220.

Fifth Embodiment

Next, a fifth embodiment of the invention will be described.

Figure 14:
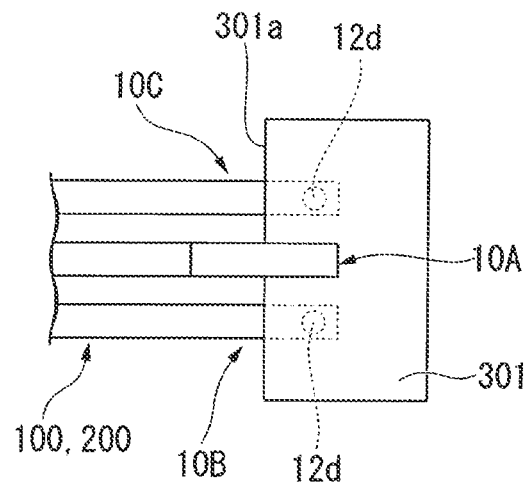
FIG. 14 is a diagram illustrating an operation of a robot device according to a fifth embodiment of the invention.
Figure 15:
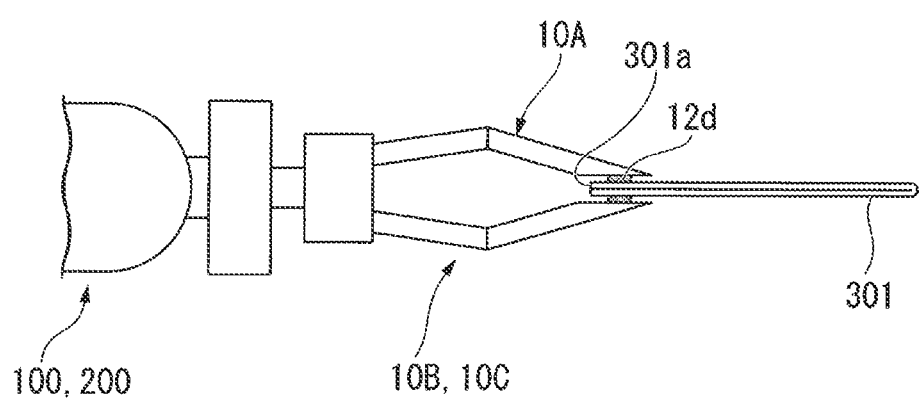
FIG. 15 is a diagram illustrating an operation of a robot hand according to the fifth embodiment.
Figure 16:
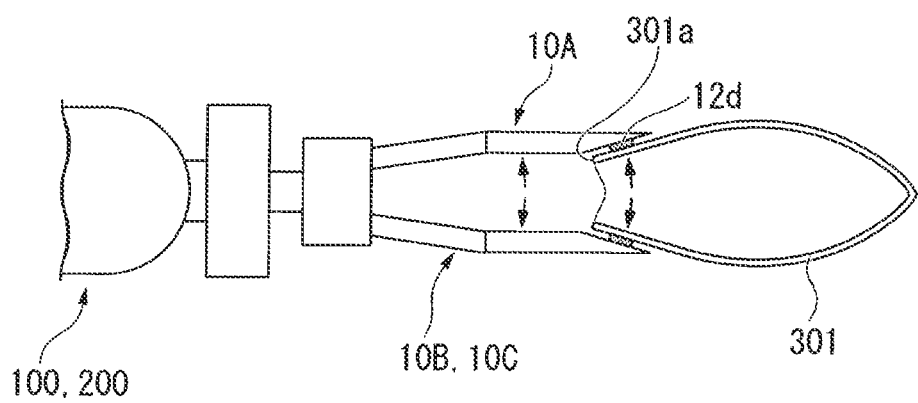
FIG. 16 is a diagram illustrating an operation of the robot hand according to the fifth embodiment.

FIGS. 14 to 16 are diagrams illustrating a state where the robot hand 100 or 200 according to the above-described embodiments is used to open an opening portion 301a of a bag member 301 such as a vinyl bag.

As shown in FIGS. 14 and 15, first, the finger units 10A, 10B and 10C are arranged on the side of the opening portion 301a of the bag member 301. At this time, the positions of the finger units 10B and 10C are adjusted so that the finger unit 10A faces one surface of the bag member 301 and the finger units 10B and 10C face the other surface of the bag member 301 in alignment. Then, the respective surfaces of the bag member 301 are attracted to the attracting pads 12d of the finger units 10A, 10B and 10C.

In this state, if the finger unit 10A and the finger units 10B and 10C are opened to move in the opposite directions, as shown in FIG. 16, one surface of the bag member 301 is pulled by the finger unit 10A and the other surface of the bag member 301 is pulled by the finger units 10B and 10C, and thus, the opening portion 301a is opened.

As described above, according to the present embodiment, by moving the finger unit 10A and the finger units 10B and 10C in the opposite directions with the front and rear surfaces of the bag member 301 being attracted, it is possible to reliably open the opening portion 301a of the bag member 301. Further, according to the present embodiment, since two separate points on the other surface of the bag member 301 are pulled by the respective attracting pads 12d of the finger units 10B and 10C, for example, even in a case where both the surfaces of the bag member 301 are in close contact with each other, it is possible to efficiently open the opening portion 301a.

Sixth Embodiment

Next, a sixth embodiment of the invention will be described.

Figure 17:
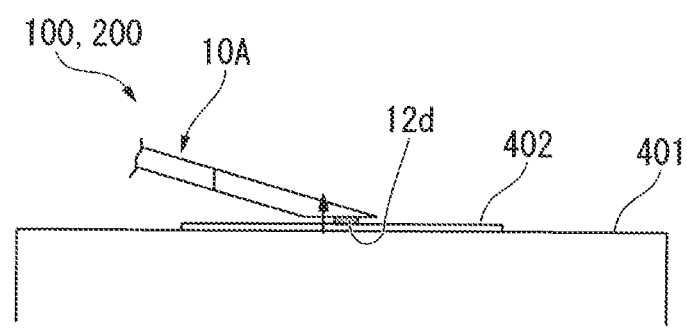
FIG. 17 is a diagram illustrating an operation of a robot hand according to a sixth embodiment of the invention.
Figure 18:
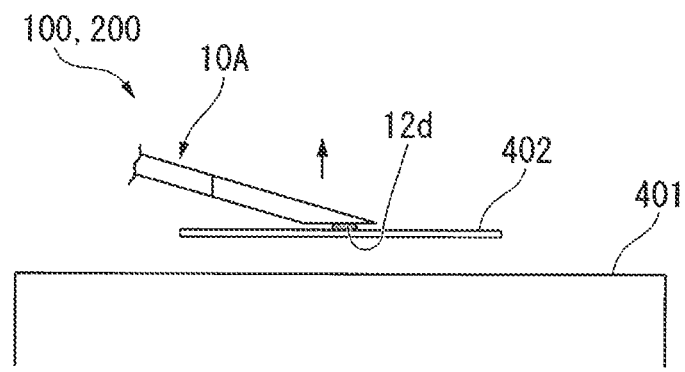
FIG. 18 is a diagram illustrating an operation of the robot hand according to the sixth embodiment.
Figure 19:
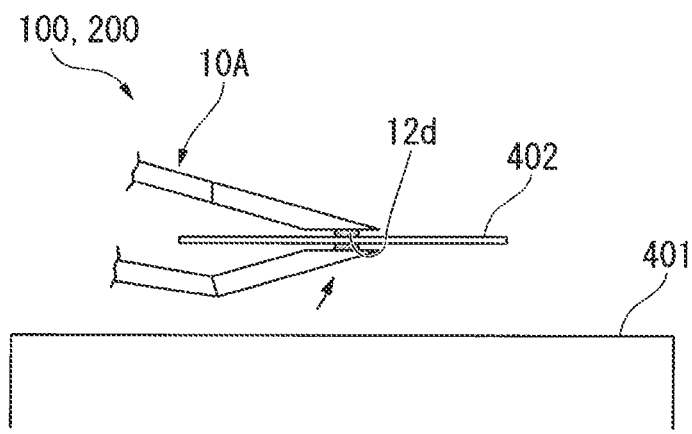
FIG. 19 is a diagram illustrating an operation of the robot hand according to the sixth embodiment.

FIGS. 17 to 19 are diagrams illustrating a state where the robot hand 100 or 200 according to the above-described embodiments is used to lift and hold a thin plate-shaped member 402 (for example, a film or the like) such as a film disposed on a table 401 (for example, a desk or the like).

First, as shown in FIG. 17, the attracting pad 12d of the finger unit 10A is in contact with a front surface of the plate-shaped member 402 and attracts the plate-shaped member 402. In this state, if the finger unit 10A moves up, as shown in FIG. 18, the plate-shaped member 402 is pulled and lifted by the finger unit 10A in the state of being attracted to the finger unit 10A.

Then, as shown in FIG. 19, the finger units 10B and 10C rotate to enter toward a rear surface (surface that is opposite to the surface attracted to the finger unit 10A) of the plate-shaped member 402 and are in contact with the rear surface of the plate-shaped member 402. Through this operation, the plate-shaped member 402 is held by the finger units 10A, 10B and 10C with the front and rear surfaces of the plate-shaped member 402 being interposed between the finger unit 10A and the finger units 10B and 10C.

As described above, according to the present embodiment, since the plate-shaped member 402 is attracted and lifted, and is then held, it is possible to stably hold even the thin plate-shaped member 402 disposed on the table 401 or the like.

Further, the components of the above-described embodiments may be appropriately replaced with known components in a range without departing from the spirit of the invention.

The entire disclosure of Japanese Patent Application No. 2012-226072, filed Oct. 11, 2012 is expressly incorporated by reference herein.

What is claimed is:

1. A method for handling a bag-shaped object having an open end and a closed end by a robot,
    the robot has:
        a first finger that has a first attracting section, the first finger having first and second states that are positionally different from each other; and
        a second finger that has a second attracting section, the second finger having third and fourth states that are positionally different from each other, the method comprising:
    placing the bag-shaped object on a table;
    attracting a first edge surface of the bag-shaped object by the first attracting section in the first state, the first edge surface being located at the open end of the bag-shaped object while the bag-shaped object is in a closed state;
    moving the first finger upwardly while the first attracting section attracts the bag-shaped object so that the bag-shaped object is spaced apart from the table; and
    attracting a second edge surface of the bag-shaped object by the second attracting section in the third state, the second edge surface being located at the open end of the bag-shaped object while the bag-shaped object is in the closed state, the second edge surface being opposite to the first edge surface, wherein
    the first finger and the second finger are respectively in the second and fourth states so that the bag-shaped object is in an open state.

2. The method for handling a bag-shaped object having an open end and a closed end by a robot, according to claim 1, wherein the first finger has a pressure sensor.

3. The method for handling a bag-shaped object having an open end and a closed end by a robot, according to claim 1, wherein each of the first and second fingers has:
- a first knuckle that is supported to a base and a second knuckle that is supported to the first knuckle section;
- a drive member that includes a male screw that is rotatable around a screw axis by a drive source and a female screw that is screw-coupled with the male screw and moves in an axial direction of the screw axis according to rotation of the male screw, in which the female screw and the first knuckle are connected to each other so that the first knuckle moves in association with movement of the female screw; and
- a link that connects the first knuckle and the second knuckle so that the second knuckle moves in association with movement of the first knuckle.

4. The method for handling a bag-shaped object having an open end and a closed end by a robot, according to claim 3, wherein the link includes:
- a first connector that connects the base and the first knuckle so that the first knuckle is rotatable around a first axis that is parallel to a tangential line of a virtual circle centering around a reference axis; and
- a second connector that connects the first knuckle and the second knuckle so that the second knuckle is rotatable around a second axis that is parallel to an axial direction of the first axis.

5. The method for handling a bag-shaped object having an open end and a closed end by a robot, according to claim 3, wherein the link includes a locking member that is locked to a first connection state where the first knuckle and the second knuckle form an angle of 180°.

6. The method for handling a bag-shaped object having an open end and a closed end by a robot, according to claim 4, wherein the base includes a planar surface that intersects with the reference axis,
wherein the planar surface is provided at an end in an axial direction of the reference axis, and
wherein each of the first and second fingers is disposed so that the first knuckle and the second knuckle protrude upward in an extending direction of the reference axis with respect to the planar surface according to rotation of the first knuckle.

7. The method for handling a bag-shaped object having an open end and a closed end by a robot, according to claim 5, wherein the planar surface has a frictional coefficient higher than that of a front surface of each of the first and second fingers.

8. The method for handling a bag-shaped object having an open end and a closed end by a robot, according to claim 3, wherein the base is connected to a multi-axial arm.

9. The method for handling a bag-shaped object having an open end and a closed end by a robot, according to claim 8, wherein the multi-axial arm is configured with a plurality of multi-axial arms.

10. The method for handling a bag-shaped object having an open end and a closed end by a robot, according to claim 1, further comprising:
- a third finger that has a third attracting section, the third finger having the third and fourth states,
wherein when the second edge surface of the bag-shaped object is attached by the second attracting section in the third state, the second edge surface of the bag-shaped object is attached by the third attracting section, and
the first finger is in the second state and the second and third fingers are in the fourth state so that the bag-shaped object is in an open state.

11. The method for handling a bag-shaped object having an open end and a closed end by a robot, according to claim 10,
wherein the first, second, and third attracting sections respectively include first, second, and third attracting pads, and
the first, second, and third attracting pads are respectively attached to tips of the first, second, and third fingers.

* * * * *